US011868349B2

(12) United States Patent
Gruszecki et al.

(10) Patent No.: US 11,868,349 B2
(45) Date of Patent: Jan. 9, 2024

(54) ROW SECURE TABLE PLAN GENERATION

(71) Applicant: INTERNATIONAL BUSINESS MACHINES CORPORATION, Armonk, NY (US)

(72) Inventors: Artur M. Gruszecki, Cracow (PL); Tomasz Sekman, Cracow (PL); Tomasz Kazalski, Balice (PL); Andrzej Jan Wrobel, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 16/867,228

(22) Filed: May 5, 2020

(65) Prior Publication Data

US 2021/0349903 A1   Nov. 11, 2021

(51) Int. Cl.
*G06F 16/2453* (2019.01)
*G06F 21/62* (2013.01)

(52) U.S. Cl.
CPC .... *G06F 16/24544* (2019.01); *G06F 21/6227* (2013.01)

(58) Field of Classification Search
CPC ............ G06F 16/24544; G06F 21/6227
USPC ....................................................... 707/718
See application file for complete search history.

(56) References Cited

U.S. PATENT DOCUMENTS

| 5,787,428 | A | 7/1998 | Hart | |
|---|---|---|---|---|
| 7,661,141 | B2 | 2/2010 | Dutta et al. | |
| 8,478,713 | B2 | 7/2013 | Cotner et al. | |
| 2005/0177570 | A1* | 8/2005 | Dutta | G06F 21/6227 |
| 2005/0289342 | A1 | 12/2005 | Needham et al. | |
| 2009/0030907 | A1* | 1/2009 | Cotner | G06F 21/6227 |
| 2009/0327242 | A1* | 12/2009 | Brown | G06F 16/24549 |
| 2010/0189251 | A1* | 7/2010 | Curren | G06F 21/6227 380/28 |
| 2012/0036162 | A1* | 2/2012 | Gimbel | G06F 16/24549 707/783 |
| 2017/0293657 | A1* | 10/2017 | Kirk | G06F 16/24549 |
| 2017/0331782 | A1* | 11/2017 | Lai | G06F 16/9535 |

OTHER PUBLICATIONS

Oracle, "Oracle Database: 2 Day + Security Guide," Oracle Database Online Documentation Library, 12c Release 1 (12.1), pp. 1-138, Jun. 2017.
Montee, Geoff, "Protect Your Data: Row-level Security in MariaDB 10.0," MariaDB, Jun. 2, 2015, pp. 1-14.

(Continued)

*Primary Examiner* — Joshua Bullock
(74) *Attorney, Agent, or Firm* — Stephanie Carusillo; George S. Blasiak; Heslin Rothenberg Farley & Mesiti P.C.

(57) ABSTRACT

Methods, computer program products, and systems are presented. The method computer program products, and systems can include, for instance: identifying an invoked database query for execution on a database, the invoked database query being associated to a user; generating an execution plan for executing the database query on the database; wherein the generating the execution plan for execution of the database query on the database includes establishing an ordering of first and second tables, the ordering of the first and second tables being in dependence on an access privilege attribute of the user in respect to the first table; and executing the database query according to the execution plan.

20 Claims, 7 Drawing Sheets

(56) References Cited

OTHER PUBLICATIONS

Teradata, "Implementing Row Level Security," Teradata Database Security Administration, Nov. 14, 2019, p. 1.
List of IBM Patent and/or Patent Applications treated as related for U.S. Appl. No. 16/867,152, filed May 5, 2020, dated Nov. 21, 2022.

* cited by examiner

ROW SECURE TABLE PLAN GENERATION

BACKGROUND

The present disclosure related generally to databases and specifically to query execution in a database.

Databases can be defined by an organized collection of data accessed electronically from a computer system. Databases can have associated Database Management Systems (DBMS). Database data can be organized in a series of tables having rows and columns of data. Database tables, in turn, can include one or more index. An index can be provided by a data structure that improves access to a database table.

Structured Query Language (SQL) is a domain specific language used in programming data management in a Database Management System (DBMS). SQL statements can be used for the performance of various database operations, such as INSERT, UPDATE, SELECT, and DELETE query operations. INSERT operations can be used for performance of input of a record into a database table, SELECT operations can be used to retrieve data from a database table, UPDATE operations can be used for changing a value within a database table, and DELETE operations can be used for removal of data from a database table.

Data structures have been employed for improving operation of a computer system. A data structure refers to an organization of data in a computer environment for improved computer system operation. Data structure types include containers, lists, stacks, queues, tables, and graphs. Data structures have been employed for improved computer system operation e.g. in terms of algorithm efficiency, memory usage efficiency, maintainability, and reliability.

SUMMARY

Shortcomings of the prior art are overcome, and additional advantages are provided, through the provision, in one aspect, of a method. The method can include, for example: identifying an invoked database query for execution on a database, the invoked database query being associated to a user; generating an execution plan for executing the database query on the database; wherein the generating the execution plan for execution of the database query on the database includes establishing an ordering of first and second tables, the ordering of the first and second tables being in dependence on an access privilege attribute of the user in respect to the first table; and executing the database query according to the execution plan.

In another aspect, a computer program product can be provided. The computer program product can include a computer readable storage medium readable by one or more processing circuit and storing instructions for execution by one or more processor for performing a method. The method can include, for example: identifying an invoked database query for execution on a database, the invoked database query being associated to a user; generating an execution plan for executing the database query on the database; wherein the generating the execution plan for execution of the database query on the database includes establishing an ordering of first and second tables, the ordering of the first and second tables being in dependence on an access privilege attribute of the user in respect to the first table; and executing the database query according to the execution plan.

In a further aspect, a system can be provided. The system can include, for example a memory. In addition, the system can include one or more processor in communication with the memory. Further, the system can include program instructions executable by the one or more processor via the memory to perform a method. The method can include, for example: identifying an invoked database query for execution on a database, the invoked database query being associated to a user; generating an execution plan for executing the database query on the database; wherein the generating the execution plan for execution of the database query on the database includes establishing an ordering of first and second tables, the ordering of the first and second tables being in dependence on an access privilege attribute of the user in respect to the first table; and executing the database query according to the execution plan.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
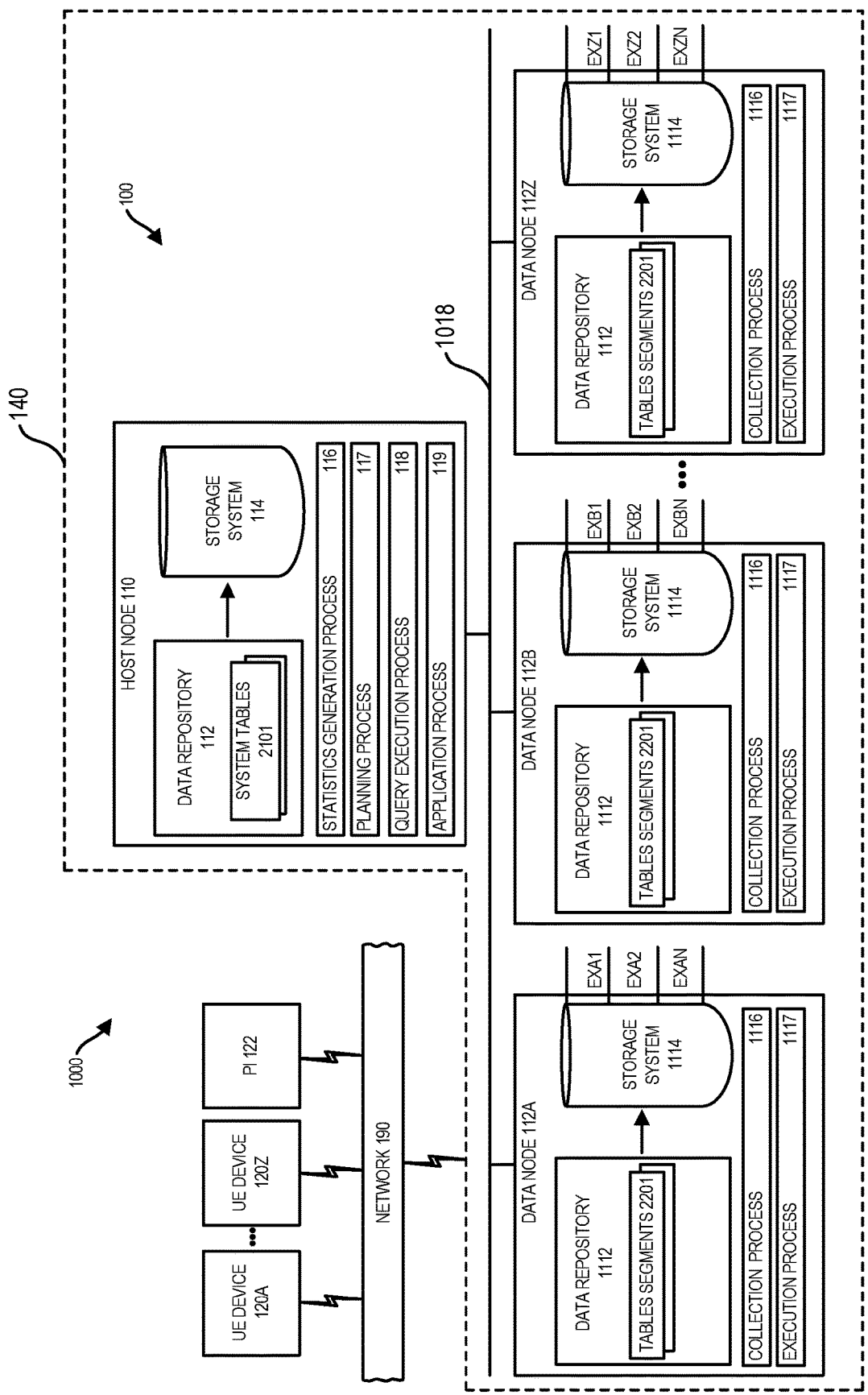
FIG. 1 depicts a system having a database, a plurality of user equipment (UE) devices, and a process interface (PI) according to one embodiment.

System 1000 for use in processing database queries is shown in FIG. 1. System 1000 can include database 100 hosted in computing environment 140 and user equipment (UE) devices 120A-120Z. Database 100 and UE devices 120A-120Z can be in communication with one another via network 190. Network 190 can be a physical network and/or a virtual network. A physical network can be, for example, a physical telecommunications network connecting numerous computing nodes for systems such as computer servers and computer clients. A virtual network can, for example, combine numerous physical networks or parts thereof into a logical virtual network. In another example, numerous virtual networks can be defined over a single physical network.

Database 100 can include a plurality of computing nodes arranged in a hierarchical order. Database 100 can include host node 110 and a plurality of child nodes provided by data nodes 112A-112Z. Host node 110 and respective ones of data nodes 112A-112Z can be provided by a physical computing node such as described by computing node 10 set forth herein. Each respective physical computing node can include one or more processor, and an associated storage system 1114. Each respective physical computing node defining host node 110 or a node of data nodes 112A-112Z can be external to each other respective physical computing node. A subset of data nodes 112A-112Z herein can be referred to as first through Nth data nodes. Database 100 can include link 1018 for providing communication between host node 110 and data nodes 112A-112Z. Link 1018 can include, e.g., a bus in accordance with any of a variety of bus architectures, and/or a Fibre Channel network.

Host node 110 can include data repository 112 that can be physically located within storage system 114 of host node 110. Data repository 112 can include system tables 2101. System tables 2101 can record data describing an organization of database 100. Storage system 114 can be provided by a storage device, e.g. disk or solid state storage device (SSD) physically associated to and defining host node 110.

Respective data nodes 112A-112Z can include data repository 1112 that can be physically located within storage system 1114 of host node 110. Data repository 1112 can include tables segments 2201. A data table of database 100 can be distributed amongst respective storage systems 1114 of data nodes 112A-112Z so that respective ones of storage systems 1114 have a segment (table segment) of the data table. A certain table of database 100 can have table segments thereof distributed amongst respective storage systems 1114 of data nodes 112A-112Z. Storage system 1114 can be provided by a storage device, e.g. disk or solid state storage device (SSD) physically associated to and defining host node 110.

System tables 2101 of host node 110 can record data specifying e.g. identifiers of data nodes of database 100, metrics data for data nodes of database 100, identifiers for data tables of database 100 distributed amongst storage systems 1114 of data nodes 112A-112Z, statistics data for data tables, and rules associated to various data tables. System tables 2101 in one aspect can store security rules associates to row secure table (RST) distributed amongst storage systems 1114 of data nodes 112A-112Z. System tables 2101 can also include statistics system tables that record statistics respecting data tables of database 100, which data tables can be distributed amongst storage system 1114 of data nodes 11A-112Z.

Referring to data nodes 112A-112Z, each respective data node of data nodes 112A-112Z can include data repository 1112 having table segments 2201. Data repository 1112 can be physically stored in storage system 1114 which can be provided e.g. by disk or solid state storage device (SSD). Storage system 1114 of each respective data node of data nodes 112A-112Z can include extents. An extent herein can refer to the smallest unit of storage system allocation e.g. disk allocation. An extent, according to one embodiment, can include an allocation of J MB of disk space. Embodiments herein can provide features so that extents of storage system 1114 can be subject to exclusion from an IO data access functions performed as part of execution of a database query.

In database 100, data tables can be distributed between respective data nodes 112A-112Z. There can be Z number of data nodes 112A-112Z, e.g. Z=4, Z=24, Z=48, Z=96, and the like. Tens to thousands or more data tables, each with tens to billions or more rows, can be distributed between respective data nodes 112A-112Z. Referring to data repository 1112 of data nodes 112A-112Z, each respective data node of data nodes 112A-112Z can include a segment of respective tables distributed between data nodes 112A-112Z.

For example, in a scenario where there are Z=24 data nodes 112A-112Z, a first data table with 24,000 rows can be distributed amongst data nodes 112A-112Z so that the first 1000 rows (table segment A) are distributed into data node 112A, the second 1000 rows (table segment B) are distributed into data node 112B, and the last 1000 rows (table segment Z) are distributed into data node 112Z. Each data node of data nodes 112A-112Z can have a dedicated one or more processor and storage system. According to an advantage of the architecture described, respective processors of the respective data nodes 112A-112Z can process in parallel to act on different segments of a common data table simultaneously.

The described architecture of database 100 provides for fast processing of a database query. For example, by respective data tables of database 100 having been split up into the described plurality of data nodes 112A-112Z and particularly into storage systems 1114 thereof, processes on a given table can be performed in parallel. With parallel processing, distributed segments of a data table distributed between data nodes can be processed simultaneously.

One type of data table that can be distributed and stored amongst storage systems of data nodes 112A-112Z is a row secure table (RST). An RST refers to a table in which different users can have different access privileges. In an RST, first users can have access to first rows of an RST and second users can have access privileges to second rows of the RST. An RST can have associated security rules that can be stored in system tables 2101. Security rules can determine access privileges to rows of an RST. RST security rules can range in complexity and can be simple to complex. A row security rule can specify, e.g., that a certain security tag (determining users who can access the row) applies to a row when a column value of the row is within a specified range. Database 100 can be configured so that host node 110 applies security rules at query receipt time to ascertain whether a user associated to a query can access data from a certain row. Database 100 can be further configured so that host node 110 applies security rules at an idle time for generation of statistics for use in updating a statistic system table. Host node 110 can later examine the updated statistics system table for query execution plan generation.

Embodiments herein can speed the performance of database 100 by use of data indicating access privileges of an RST. Embodiments herein recognize that speed of a JOIN process of a database query can be increased by establishing an order for a JOIN clause of a database query so that a smaller table referenced in a JOIN clause precedes a larger table referenced in the JOIN clause. Embodiments further herein can use an adjusted table size of an RST for determining a JOIN clause order based on table size wherein the adjusted table size is in dependence on user access privileges in an RST. Embodiments herein recognize that establishing an order for a JOIN clause based on a raw (unadjusted, actual) table row size can slow performance of database 100. For identification of an adjusted table row size, embodiments herein as part of statistics generation process 116 can apply security rules to an RST for return of data indicating access privileges associated to respective rows of the RST.

Host node 110 can process invoked database queries. For processing an invoked database query, host node 110 can use statistics collected as a result of running statistics generation process 116 to generate statistics respecting data tables distributed between data nodes 112A-112Z, planning process 117 to provide a query execution plan, and query execution process 118 for execution of a database query.

Host node 110 running statistics generation process 116 can include host node 110 sending statistics generation command data to data nodes 112A-112Z for examination of data tables stored on respective storage systems 1114 of the data nodes 112A-112Z. In response to the statistics generating command data, data nodes 112A-112Z can return table statistical data and host node 110 in response to the table statistical data can update one or more statistics system table of system tables 2101.

Host node 110 running statistics generation process 116 in response to the returned table statistical data can update statistics system tables of system tables 210. Statistics system tables can record statistical data on one or more data table of database 100 distributed amongst storage systems 1114 of data nodes 112A-112Z. Host node 110 running statistics generation process 116 can update one or more statistics system table of system tables 2101 that records data respecting one or more RST of database 100. An RST herein can refer to a data table of database 100 in which different users have different access privileges.

Host node 110 running statistics generation process 116 can update a statistics system table of system tables 2101 that records data on a row secure table (RST) of database 100 so that the statistics system table records row statistical data in respect to an RST. The row statistical data can specify, e.g., a number of rows of an RST accessible by a first user and number of rows of an RST accessible by second users.

For generation of statistical data of RSTs, host node 110 running statistics generation process 116 can include host node 110 sending statistics generating command data provided by security rules command data for application of security rules. As noted, RSTs can include associated security rules for running in runtime for processing of a database query. Embodiments herein can include, for generation of statistics on an RST, host node 110 sending to data nodes 112A-112Z security rules command data for application of security rules to one or more RST distributed amongst storage systems 1114 of data nodes. In response to the security rules command data, data nodes 112A-112Z can return RST statistics that specify security data in reference to respective rows of an RST. The security data can take the form of security tags. Database 100 can be configured so that a certain user has access privileges to a certain row of the RST, where the user is associated to a security tag in common with the security tag of the row.

Host node 110 running planning process 117 can include host node 110 generating an execution plan for executing a query in response to host node 110 identifying an invoked query, such as a user invoked query or a process invoked query. Host node 110 running planning process 117 can include host node 110 in response to an invoked query, examining statistics system tables of system tables 2101 updated by running of statistics generation process 116. The statistics system tables can include statistics system tables that record statistics on one or more RST. A statistics system table for an RST can specify, for example, that different users have differentiated access privileges between different rows of an RST. Host node 110 running planning process 117 can include host node 110, in response to an invoked database query having a JOIN clause, identifying an RST and a user associated to the database query. Host node 110, in response to an identified RST and user, can locate the appropriate statistics system table from system tables 2101 associated to the identified RST and can use the identified user identifier to identify from the located appropriate statistics system table access privileges in the RST of the user. Using the determined user access privileges in the located statistics system table, host node 110 can establish an ordering of tables for performance of the JOIN clause in the invoked database query.

A statistics system table for an RST stored in a system table of system tables 2101 can specify that a first user can selectively access first rows of an RST and can specify that a second user can selectively access second rows of an RST. According to one scenario, host node 110 running planning process 117 can include host node 110 providing an ordered list of tables ranked by table size for use in execution of a database query. Host node 110 running planning process 117 can include host node 110 generating an execution plan for execution of a query having a JOIN clause.

According to one embodiment, host node 110, when generating an execution plan for execution of a query having a JOIN clause, can identify sizes of first and second tables being joined by performance of a JOIN process specified by a JOIN clause. Embodiments herein recognize that latencies can be reduced in the performance of a JOIN clause by ordering of tables to be joined from smaller size to larger size. In a further aspect herein, host node 110 in performing a JOIN process involving an RST can ascertain an adjusted table size of the RST. According to one embodiment, statistics generated for an RST can specify that an RST has an adjusted table size that is adjusted based on the perspective of the user.

For determining a size of tables to be joined, host node 110 can ascertain table size of an RST from the perspective of a user. For ascertaining table size of an RST from the perspective of a user, host node 110 can examine RST statistics recorded in a statistics system table that specify differing access privileges of different users. For example, with use of a statistics system table, host node 110 can determine that the RST table of Table A has a row size of a first value from the perspective of a user of Group G_02 and a row size of a second value from the perspective of a user of Group G_03.

Embodiments herein recognize that execution of a database query having a JOIN clause can be accelerated by selection of a table order so that a smaller table precedes a larger table. Embodiments further recognize herein that certain tables can have differentiated table sizes based on the perspective of a user. An RST can have a first table row size from the perspective of a first user and a second table row size from the perspective of a second user. Embodiments herein can feature a process for determining an adjusted table size for an RST that specifies a number of rows for different users. The process can include use of a statistics generation process that applies security rules to an RST in idle time for return of row security data that can be used for update of a statistics system table. The security rules applied in idle time can be security rules applied in runtime for extraction of a query execution plan. On identification of an invoked database query referencing a JOIN clause for a certain RST associated to a user, the statistics system table can be examined to determine an adjusted table size of the table, and an ordering of tables for execution of the JOIN clause can be based on the adjusted table size.

Host node 110 running query execution process 118 can include host node 110 executing the query execution plan resulting from running of planning process 117. The execution of an execution plan can include performing a JOIN clause with use of an ordering of table sizes from smaller table to larger table size based on examination of a statistics system table, e.g., as shown in Table B, in which data of user privileges in an RST table is recorded.

Host node 110 running services process 119 can include host node 110 processing received user defined data to identify data queries invoked by the user defined data. Host node 110 running application process 119 can provide features that adapt database 100 for a particular service which can be e.g. a scheduling service, a subscription service, an entertainment service, a manufacturing support service, or the like. Application process 119 in one embodiment can provide a particularly designed user interface configured for (a) receipt of user defined data from which a user invoked query can be identified, as well as (b) output of data from database 100 to a user. In addition to or in place of receiving query invoking user defined data from UE devices 120A-120Z, database 100 can receive query invoking process defined data from process interface PI 122, e.g., an automated process as shown in FIG. 1. Database queries herein can include user invoked and/or process invoked queries. Application process 119 accordingly, in one embodiment, can provide a particularly designed PI 122 configured for (a) receipt of process defined data from which a process invoked query can be identified, as well as (b) output of data from database 100 to the process.

Referring to data nodes 112A-112Z, each respective data node of data nodes 112A-112Z can include data repository 1112 having table segments 2201. Data repository 1112 can be physically stored in storage system 1114 which can be provided e.g. by disk or solid stage storage device (SSD). Storage system 1114 of each respective data node of data nodes 112A-112Z can include extents. An extent herein can refer to the smallest unit of storage system allocation e.g. disk allocation. An extent, according to one embodiment, can include an allocation of J MB of disk space. Embodiments herein can provide featurization so that extents of storage system 1114 can be subject to exclusion from an TO data access function performed as part of execution of a database query.

Respective data nodes 112A-112Z can further perform collection process 1116 and execute process 1117. Data node 112A performing collection process 1116 can respond to statistics collection command data from host node 110 for the collection of statistics with respect to data tables on data nodes 112A-112Z. Data node 112A performing execute process 1117 can perform functions with respect to storage system 1114 for execution of a database query in accordance with an execution plan returned by host node 110 performing planning process 117. Data nodes 112B-112Z can also run their respective instances of collection process 1116 for execution of a database query in accordance with an execution plan. Data nodes 112B-112Z can also run their respective instances of execute process 1117 for execution of a database query in accordance with an execution plan.

Figure 2:
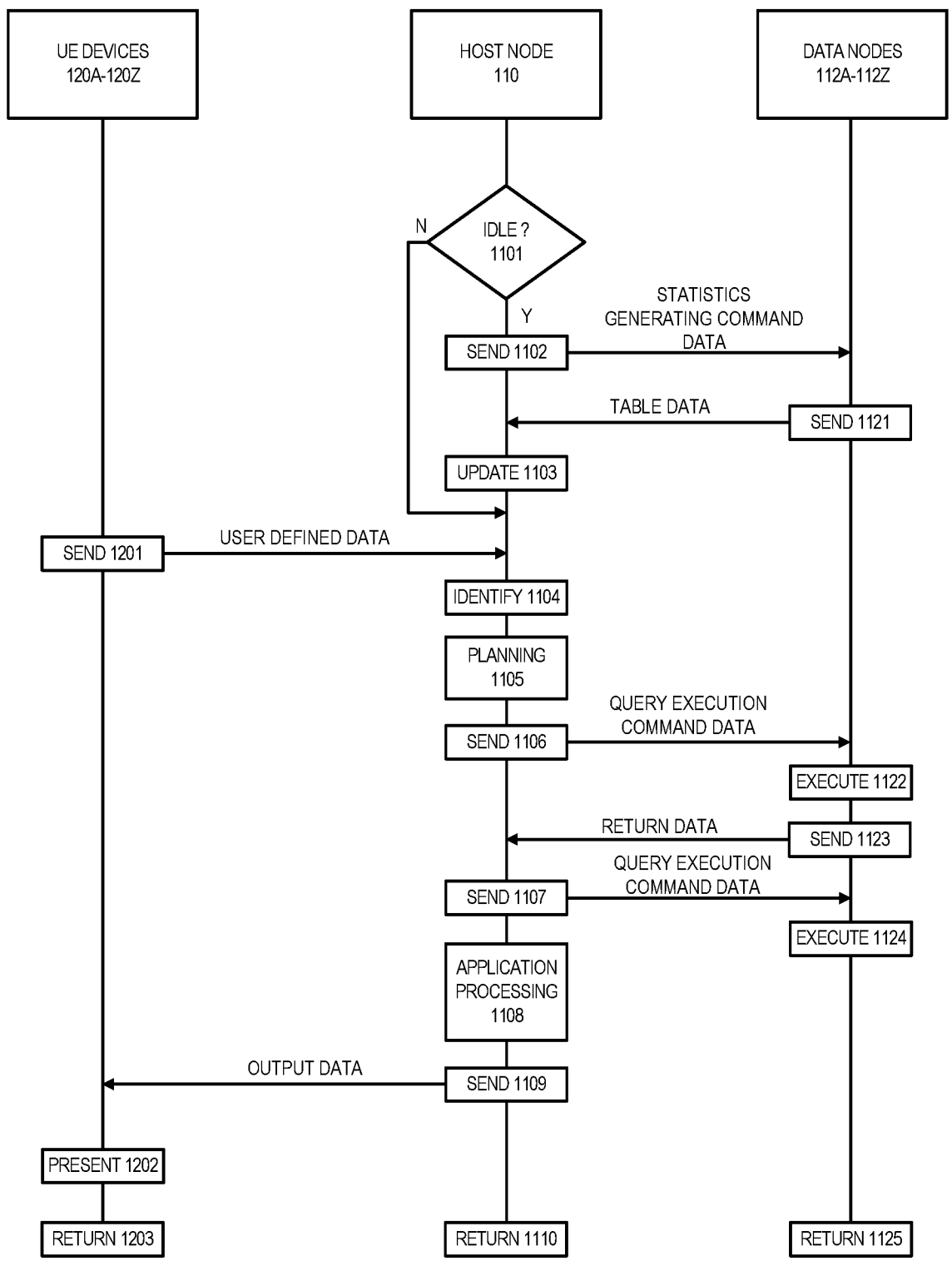
FIG. 2 is a flowchart illustrating a method for performance by a host node of a database interoperating with a plurality of data nodes according to one embodiment.

A method for performance by host node 110 interoperating with data nodes 112A-112Z and UE devices 120A-120Z is set forth in reference to the flow chart of FIG. 2.

At block 1101, host node 110 can determine whether host node 110 is idle. Host node 110 can determine that host node 110 is idle, e.g., when host node 110 has not identified a newly invoked database query for more than a threshold period of time. On determining that host node 110 is idle, host node 110 can proceed to block 1102. At block 1102, host node 110 can send statistics generating command data to data nodes 112A-112Z to return table data that can include data table statistics.

Data table statistics can include, e.g., data table statistics respecting data tables stored in and distributed throughout storage systems 1114 of data nodes 112A-112Z. At block 1121, data nodes 112A running collection process 1116 can respond to the statistics collection command data to examine data tables stored on storage systems 1114 for return of statistics data respecting data tables distributed amongst respective storage systems 1114 of data nodes 112A-112Z. Data nodes 112A-112Z by collection process 1116 can send table data including data table statistics data to host node 110 at block 1121.

Host node 110, in response to receiving the table data sent at block 1121, can at block 1103 update statistics system tables that record statistics on data tables of database 100. Statistics system tables that can be updated can include system tables that record security data on row secure tables (RSTs) of database 100. In an RST, different users can have selective access to different rows.

According to one scenario, host node 110 sending statistics generating command data at block 1102 can include host node 110 sending security rules command data for applying security rules to data tables provided by RSTs distributed amongst storage systems 1114 of respective data nodes 112A-112Z. According to one scenario, access privileges of different users to an RST can be determined with use of applied security rules stored in system tables 2101 of data repository 112.

An example of host node 110 applying security rules to extract row security data statistics is illustrated with reference to Table A.

TABLE A

| Row | DATE | CUST_ID | SYMBOL | Result of calculation applying security rule (resulting security tag): |
|---|---|---|---|---|
| 01 | 01 | 205 | NZX | CONF |
| 02 | 01 | 100 | IBX | PUBLIC |
| 03 | 01 | 400 | NZX | AUDIT |
| 04 | 01 | 100 | NCX | PUBLIC |
| 05 | 02 | 700 | SUNX | ADMIN |
| 06 | 02 | 100 | LTXX | PUBLIC |
| 07 | 02 | 300 | NZX | CONF |
| 08 | 03 | 210 | IBX | CONF |
| 09 | 03 | 850 | ANX | ADMIN |
| 10 | 03 | 205 | BPX | CONF |

Referring to Table A, host node 110 can send security rule command data responded to by data nodes 112A-112Z so that data nodes 112A-112Z return statistics data provided by security data specifying for each row a security tag indicating a classification of security required for access to respective rows of an RST. Table A depicts an RST and security tags associated to respective rows of the RST. Host node 110 applying row security rules can determine, for example, that a user associated to a CONF security tag can obtain access to Row 01, and that a user associated to a PUBLIC security tag can obtain access to Row 02, and so on. As set forth herein, system tables 2101 can include one or more security association table that associates users to security privileges.

Database 100 can be configured so that security rules can change between RSTs. In the described example of the RST of Table A, row security rules can be selected so that access privileges are allocated in dependence on a value within the CUST_ID column (first access privileges allocated for first range, second access privileges allocated for second range). It will be understood that alternative rules can be specified by an administrator user, and/or generated by an automated process. Rules can be based e.g. on values of one column of an RST, or more than one column, and/or data external to an RST.

The process described with reference to Table A can be performed as part of a process for execution of a database query. For example, on the identification of an invoked query, host node 110 can send security rule commands as described in connection with Table A for application of security rules to return the security tags as shown in Table A and then use the tags in the determination of a query execution plan. Embodiments herein recognize that the described security rules application process for security tag extraction used for query handling and execution can be used for generating statistics in idle time. The statistics can be recorded into a statistics system table and can be used by a host node for determining an ordering of table size. RSTs can be processed as having an adjusted table size.

Using the results data described in Table A, host node 110 can update a statistics system table that records statistics for the RST of Table A.

A statistics system table of system tables 2101 that records statistics for the RST of Table A is shown in Table B.

TABLE B

| TABLE_STATISTIC after update using results data from Table A (entry for TRADE table) | | | | |
|---|---|---|---|---|
| TABLE_ID | TABLE_NAME | ROW_COUNT | NO OF NULLS | ...TS_PU_GROUP_ID |
| 1000 | TRADE | 100 000 | 1000 | ...G_01 |
| 1000 | TRADE | 60 000 | 600 | G_02 |
| 1000 | TRADE | 10 000 | 100 | ...G_03 |

The statistics system table of Table B specifies that different users of database 100 have different access privileges in the RST of Table A. In an important aspect, the statistics system table of Table B includes a user column (called TS_PU_GROUP_ID in the described example) that facilitates reporting of differnentiated row privileges between different users. The statistics system table of Table B specifies that users of Group G_01 can have access to all 100,000 rows of the RST of Table A, that users of Group G_02 can have access to 60,000 rows of the RST of Table A, and that users of Group G_03 can have access to 10,000 rows of the RST of Table A.

Host node 110 can use security association system tables with the security tag results data of FIG. A to provision Table B. System security tables can specify user security privileges based on user ID, Group ID, role, and the like. An exemplary set of security association system tables is described with reference to tables C-E.

Table C associates users to roles.

TABLE C

| User_ID | Role |
|---|---|
| U001 | DIRECTOR |
| U002 | END USER |
| U003 | EMPLOYEE |
| U004 | CEO |

Figure 3:
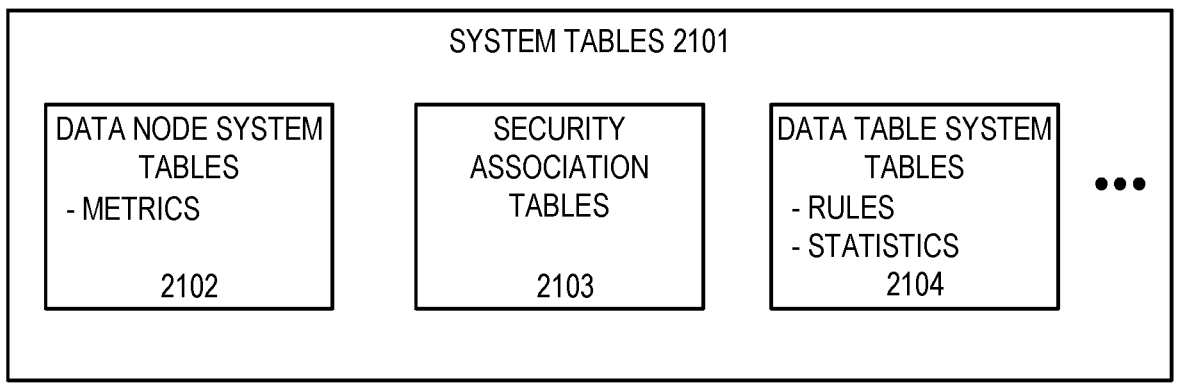
FIG. 3 depicts a computing node according to one embodiment.

On registration and enrollment into database 100, a user can be assigned a role, e.g. CEO, Director, Officer, Administrator, Employee, End User, and the like. System tables 2101 as depicted in FIG. 3 can include, e.g., data node system tables 2102 recording data on data nodes 112A-112B, security association system tables 2103 as described in connection with Tables C-G, and data table system tables 2104 for recording data on data tables that can be distributed amongst storage systems 1114 of data nodes 112A-112Z.

Table D associates Group IDs to roles.

TABLE D

| Group_ID | Role |
|---|---|
| G_01 | CEO |
| G_01 | ADMINISTRATOR |
| G_02 | OFFICER |
| G_02 | DIRECTOR |
| G_03 | EMPLOYEE |
| G_03 | END USER |

Embodiments herein recognize that users of different groups can be assigned common classifications of access privileges. Table D allows, e.g., both of a CEO and an Administrator to be assigned to the same Group, Group G_01.

Table E allows group names to be specified for various groups.

TABLE E

| GROUP_ID | ST_TAG |
|---|---|
| G_01 | UNLIMITED |
| G_02 | PRIORITY USERS |
| G_03 | GENERAL |

The Group G_01 can be assigned the name UNLIMITED, the Group G_02 can be assigned the name PRIORITY USERS, and the Group G_03 can be assigned the name GENERAL.

Table F permits security tags to be specified.

TABLE F

| ST_ID | ST_TAG |
|---|---|
| 101 | PUBLIC |
| 201 | CONF |
| 301 | AUDIT |
| 401 | ADMIN |

Security tags can specify different security functions. Database 100 can be configured so that when a row is flagged (e.g. using the Table A processing) with a certain security tag, a user can access data of the row if the user belongs to a group associated to the certain security tag.

For mapping between a group of users and security tags, table G can be provided.

TABLE G

| (PRIVS_USED) | |
|---|---|
| PU_GROUP_ID | PU_ST_ID |
| G_01 | 101 |
| G_01 | 201 |

TABLE G-continued (PRIVS_USED)

| PU_GROUP_ID | PU_ST_ID |
|---|---|
| G_01 | 301 |
| G_01 | 401 |
| G_02 | 101 |
| G_02 | 201 |
| G_02 | 301 |
| G_03 | 101 |

Table G can map user groups to security tags. Referring to Table G, users of Group G_01 can access data tagged with any security tag, 101, 201, 301 or 401. Users of Group G_02 can access data tagged with only tags 101, 201, or 301. Users of Group G_03 can access data tagged only with tag 101. With use security association system tables of Tables C-G, a high degree of flexibility can be achieved. For example, new user groups having differentiated associated sets of security tags can readily be provisioned. New security tags can be provisioned to define new user groups.

Referring to Table A and Table B, host node 110 can discern applicable groups associated to the reported security tags of Table A by way of table lookup using Table G.

Referring further to the flowchart of FIG. 2, a user of a UE device of UE devices 120A-120Z can invoke a database query at block 1201. At block 1201, a UE device of UE devices 120A-120Z can send user defined data to host node 110 where the user defined data invokes a database query. At block 1104, in response to receipt of the user defined data, host node 110 can identify an invoked database query. Alternatively, at block 1201, a process interface, PI 122, in addition to or in place of a user using user interface can invoke a database query.

In response to the identification of a user or process invoked query at block 1104, host node 110 at planning block 1105 can activate planning process 117 (FIG. 1). Host node 110 running planning process 117 can include host node 110 applying a cost based approach to planning. Using a cost based approach to planning, host node 110 can select a plan for execution based on lowest number of operations to complete the plan.

Example

For improvement of database performance, smallest tables can be placed at the beginning for a JOIN process and largest on the end of a JOIN process. In some systems, a database engine can join only two tables in one JOIN process and the next JOIN would be performed on the result set of the data (from the first join) and the next table. For many SQL queries, the database engine has freedom of sequence in a JOIN process. A database can provide candidate plans and select the plan where the amount of processed data will be smaller.

Consider the following tables: t1 with 100 000 000 rows, t2 with 1 000 rows, t3 with 10 rows, and the following select: select*from t1, t2, t3 where t1.a=t2.b and t2.c=t3.d. For select as above, the database engine can join: (1) t1 with t2 and then t3 (this is the plan 1) or (2) t2 with t3 and then t1 (this is the plan 2) so for (plan 1), there can be processed the first join: t1 with t2→(100 000 000*1000)/join_rate (usually assumed as 10)=10 000 000 000, and then the second join with t3 (10 000 000 000 (from the first join)*10)/join rate (usually assumed as 10) 10 000 000 000. Accordingly, in total, there is 20 000 000 000 operation for plan 1. For (plan 2), there can be processed the first join t2 with t3→(1 000*10)/join_rate (usually assumed as 10)=1 000 and the second join with t1→(1 000 (from the first join)*1 000 000 000)/join_rate (usually assumed as 10)=10 000 000 000. Accordingly, there are 10 000 001 000 operations for plan 2.

If the database engine 'knows' the accurate number of the rows in the table, it can choose the plan with a smaller number of operations (here plan 2). For regular (non-RST) tables, table size can be identified from database statistics which can indicate a number of rows in a table or include another estimate of table size. There is set forth herein an enhanced statistics system table which provides enhanced table statistics for an RST. The table statistics for an RST can provide not only a number of rows for an RST, but also, the more granular information of the number of rows accessible to different users. The differentiated row access privilege attributes for different users can be used to define an adjusted table size for an RST. The adjusted table size data can be provided so that from the perspective of different users, a table can have different sizes. Embodiments herein can use the described adjusted table size in providing an ordering of tables from smallest to largest for optimization of a JOIN clause.

End of Example

Host node 110 at planning block 1105 can run planning process 117 (FIG. 1) to generate a plan for executing the newly invoked database query identified at 1104. According to one aspect, an identified database query can include a JOIN clause.

Embodiments herein recognize that database query processing time can be substantially reduced by optimized ordering of tables subject to joining by performance of a JOIN process specified by a JOIN clause of a database query. Embodiments herein recognize that JOIN processes can be accelerated by ordering of tables to be joined by a certain order wherein a smaller sized table precedes a larger sized table. In a further aspect herein, host node 110 can use an adjusted table size in determining a table size of a table for purposes of determining an ordering of tables to be joined in a JOIN process. An adjusted table size can be adjusted based on a user's access privileges to rows in an RST, e.g., as can be summarized in a statistics system table as shown in Table B.

According to one scenario, an identified database query identified at block 1104 can be a database query specifying a JOIN clause. For processing a database query having a JOIN clause, host node 110 can establish a table order for a JOIN process so that a smaller table for purposes of performing the JOIN process is specified as the first in the JOIN process and a second relatively larger table for purposes of the JOIN process is specified as a second table. For an optimized JOIN process, first and second tables can be ordered in an order from smaller table to larger table.

In the described scenario, host node 110, for determining a table order according to size for performance of a JOIN process, can use an adjusted size of a table such as an RST. For providing an adjusted table size, host node 110 can identify a user associated to a query and can ascertain a table size from the perspective of a user.

According to one embodiment, host node 110 can determine an adjusted table size of a table for purposes of a JOIN process using the statistics system table as set forth in Table B. According to the Table B statistics, an RST can have different sizes from the perspective of different users, depending on the user's access privileges.

Referring to Table B, the RST summarized in Table B can have a size of 100,000 rows from the perspective of Group_01 users, can have a size of 60,000 rows from the perspective of Group_02 users, and can have a size of 10,000 rows from the perspective of Group_03 users.

In performing generating of an execution plan at block 1105, according to one scenario, host node 110 can (a) identify a certain user and an RST associated to an incoming database query having a JOIN clause, (b) examine accumulated statistics for the RST specifying an adjusted table size of the RST for the certain user, and (c) establish a table order for a JOIN process according to the JOIN clause using the adjusted table size.

Figure 4:
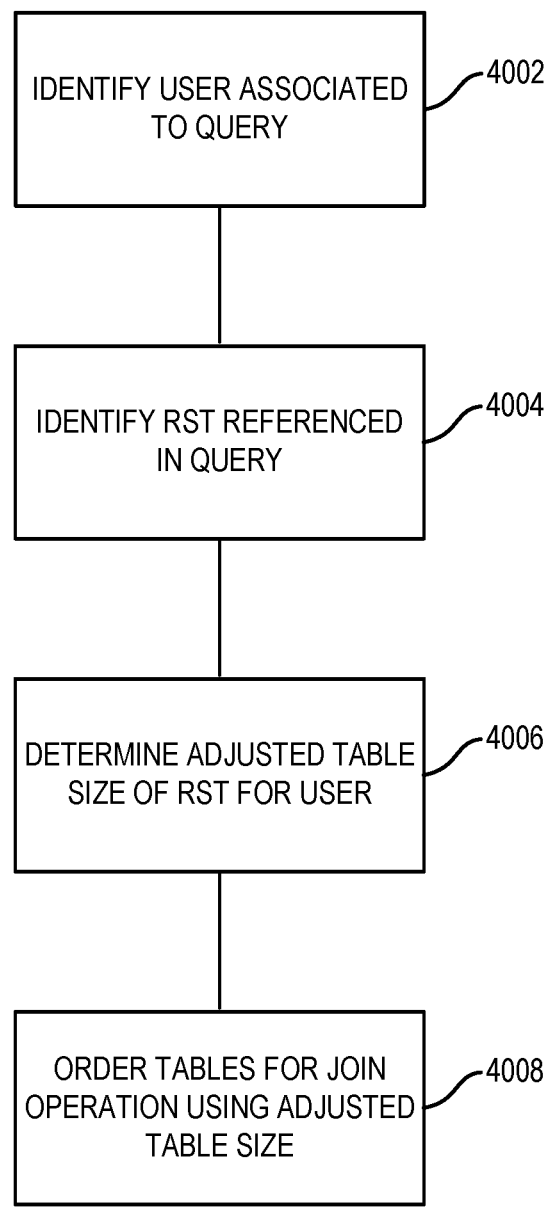
FIG. 4 depicts a schematic diagram for a data repository according to one embodiment.

For generation of an execution plan based on an identified query identified at block 1104, host node 110 can perform the method as set forth in FIG. 4. The identified query can include, e.g., one or more SELECT statement and one or more JOIN clause. At block 4002, host node 110 can identify a user associated to the identified query. The associated user can include, e.g., the user sending the user defined data at block 1202 or a user referenced in a process invoked query. At block 4004, host node 110 can identify an RST referenced in the query. On identification of an RST, host node 110 at block 4004 can locate a statistics system table of system tables 2101 recording statistics of the RST. An example of such a statistics system table is shown in Table B. At block 4006, host node 110 can determine an adjusted table size for the RST identified at block 4004. For determining an adjusted table size of the RST, host node 110 can locate a row of data of the statistics system table referenced at block 4004 that is associated to the user. The statistics system table referenced at block 4004 used for determining an adjusted table size can be associated to the RST identified at block 4004. Where the statistics system table referenced at block 4004 is configured as set forth in Table B, host node 110 can determine using one or more security association tables, e.g., table such as Tables C-G, that the user is of Group G_02, and can determine from the statistics system table of Table B that the user has access to 60,000 rows of the identified RST identified at block 4004. According to one embodiment, table size herein can be defined by (and expressed in terms of) number of rows of a table (table row size). At block 4008, host node 110 can use the adjusted table size determined at block 4006 to establish a table order for performance of a JOIN process that involves the identified RST identified at block 4004. For example, if the JOIN clause specifies joining of the identified RST (having a raw table row size of 100,000 rows and an adjusted table row size of 60,000 rows) with a second table having a table row size of 80,000 rows, host node 110 can establish an order for a JOIN process wherein the identified RST is ordered before the second table notwithstanding having a raw table row size greater than a row size the second table.

At database query processing time, in response to identification of a database query, host node 110 can apply the security rules to determine access privileges in relation to rows of an RST as described in connection with Table A, and can use the results in the generation of a database execution plan at block 1105. The database query processing time application of the security rules can result in updated results relative the application of the security rules as described in connection with block 1102 for return of statistics data at block 1121, and can be absent of an associated statistics generation described in reference to Table B.

Referring again to system tables 2101 of host node 110 as shown in FIG. 3 statistics system tables of data table system tables 2104 can include historical statistics tables from historical databases sessions. According to one embodiment, host node 110 can be configured to use historical statistics data of system tables 2101 for improving generating of an execution plan for a current database query.

According to one embodiment, system tables 2101 can support database query plan generation with use of query execution history data. Database 100 can be configured so that when a database query is executed, database 100 stores in statistics system tables of system tables 2101 the following statistics: (a) the executed query itself, (b) data on users associated to the executed query, (c) data on consumed time and resources associated to the executed query, and (d) data on objects, e.g., RST(s) and other tables associated to an executed query. Host node 110 can be configured so that host node 110 can use the described history data to optimize generating an execution plan for an incoming database query. In some embodiments, host node 110 can use historical query statistics as training data for training of one or more predictive model and can query the trained one or more predictive model for query generation.

Host node 110 can be configured so that when an invoked query is identified, host node 110 can query a predictive model that has been trained with historical data defined by the described historical data statistics system tables of system tables 2101. Host node 110 can query such predictive model with use of identified attributes of the newly invoked query and the output of the predictive model can be used for execution plan generation.

For a particular query execution stored in data repository 112, host node 110 can check to determine, e.g., whether an RST was used. In the case that an RST was involved and knowing the user's ID, host node 110 can discover with use of historical data of data repository 112 what security tags were checked for approval of access to an RST in the execution of the historical query. Host node 110 can use discovered attributes of a prior executed query as an input for plan generation with reference to a newly invoked database query.

Statistics system tables of system tables 2101 can store data on the real usage of security tags per each user. Based on a set of used security tags, database 100 can identify a unique combination of security tags per group of users (e.g. a group of users with the same privileges). The group data can be stored into statistics system tables of system tables 2101 of data repository 112 with security tags (privs_used).

Host node 110 can generate statistics specific per each group (ts_pu_group_id) separately. When user A invokes a new database query (referencing an RST), host node 110 can determine the group to which the user belongs, can find statistics data for that group, and can use various stored values from historical statistics data (like row count/dispersion) to generate an execution plan.

In response to completion of block 1105, host node 110 can proceed to block 1106. At block 1106, host node 110 can initiate an execution of a database query in response to return of an execution plan at block 1106. For initiating execution of a database query, host node 110 at block 1106 can send query execution command data to data nodes of data nodes 112A-112Z. In response to receipt of the query execution command data, various ones of data nodes 112A-112Z can execute the query command data at block 1122. At block 1123, various ones of data nodes of data nodes 112A-112Z can send return data to host node 110.

For example, in a JOIN process, content of first and second tables can be sent by data nodes of data nodes 112A-112Z to host node 110 for processing by host node 110. At send block 1107, host node 110 can send further query execution command data to various ones of data nodes of data nodes 112A-112Z and the various ones of data nodes can execute the further query execution command data sent at block 1107 to complete the execution of the identified data query. For example, where a JOIN process results in a new table that is stored as a new data table, the new table can be distributed into storage systems 1114 of data nodes 112A-112Z by performance of execute block 1124.

In response to completion of send block 1107, host node 110 can proceed to application processing block 1108. At application processing block 1108, host node 110 can process returned database data returned from database 100 into a form according to requirements of particular application in support of a service, e.g. as part of a subscription service, financial services service, social media service, and the like. Host node 110, in response to completing application processing block 1108 can, at send block 1109, send output data to the certain UE device sending user defined data at block 1201. In addition, or alternatively at block 1109, host node 110 can send output data to a process interface, e.g., PI 122. In response to the receipt of the output data, the certain UE device of UE devices 120A-120Z can present at present block 1202 the output data, e.g., on a user interface e.g. displayed or otherwise presented. Responsively to the presentment, the certain UE device can proceed to return block 1203.

At return block 1203, the certain UE device can return to a stage preceding block 1201 to wait for additional user defined data to be defined by data entry. In response to send block 1109 by host node 110, host node 110 can proceed to return block 1110. At return block 1110, host node 110 can return to a stage proceeding block 1101 to wait for additional user defined data that can invoke a next user invoked database query. Host node 110 can iteratively perform the loop of blocks 1101-1110 during a deployment period of host node 110 and can identify invoked database queries from a plurality of users and/or processes iteratively. UE devices 120A-120Z associated with the respective users can iteratively perform the loop of blocks 1121-1125 during a deployment period of host node 110 and all processes capable of invoking database queries can iteratively perform the loop of blocks 1121-1125 during a deployment period of host node 110. In response to completion of execute block 1124 of data nodes of data nodes 112A-112Z, data nodes 112A-112Z can proceed to return block 1125. At return block 1125, data nodes 112A-112Z can return to a stage preceding block 1121 to responsively send table statistics data at block 1121 responsively to receipt of statistics generating command data.

In the processing of a database query, host node 110 can generate an execution plan. A database query can be invoked in SQL. Given that SQL is declarative from its nature, there are alternative ways of processing the SQL statement, with widely varying performance. There is a special process inside the database engine, called planner, responsible for choosing an optimal path of execution of a particular statement. Generally, there are two different types of planners: (a) rule-based optimizers (RBO), and (b) cost-based optimizers (CBO).

Database 100 can use a cost-based optimized (CBO) planner. In one aspect, one of the key factors for plan generation is a proper estimation of the size of tables participating in the query. Embodiments herein can feature reading of system statistics for plan generation. Statistics can be stored for each usertable and can contain various information e.g. row count and size and values dispersal, which can be used for estimating the size of a table (or its part) used in a query. In one embodiment, database 100 can feature elements in common with commercially available hardware accelerated database, e.g. IBM® PureData™ System for Analytics (also known as a Netezza® system). IBM® PureData™ System for Analytics and Netezza® are trademarks of International Business Machines Corporation.

A row secure table (RST) can be provided as a table with security labels on rows used for filtering out data (rows) based on the user privileges. Consequently, first and second users, with different privileges, can obtain a different set of rows for the same SQL query executed against the same RST in the same moment. Accordingly, a functional table size can be different for first and second users with different privileges.

Embodiments herein recognize that statistics are created for an entire table and do not take into account restrictions incoming from row securing. Embodiments herein recognize that in the scenario that a user's access to a row secure table is restricted, a planner can establish a poor functioning join order of the tables.

Embodiments herein can introduce various features into the database engine that includes RSTs. Embodiments herein can include system tables for encoding security tags used in the system and to mirror security privileges used in the system. Embodiments herein can change the granularity of table statistics by inclusion of a column referencing combination of the privileges. Embodiments herein can modify the way statistics are collected and can use enhanced statistics during planning.

Embodiments herein can include, for example, (1) adding system tables, (2) changing the granularity of table statistics, (3) modifying the manner in which statistics are collected, and (4) using the enhanced statistics during plan generation.

Regarding (1) adding system tables, system tables can be added set forth in Table H.

TABLE H (Adding System Tables)

(a) for encoding the security tags (unique) used in the system
Table
security_tags ( st_id , st_mls_group, ,st_tag )
Example:
- In the system, there are applied Level and Category with values
Level
PUBLIC 0
CONF 10
and
Category
PUB 1
AUDIT 2
The table security_tags contains:
1, Level, PUBLIC
2, Level, CONF
3, Category, PUB
4, Category, AUDIT
(b) for storing a combination of the tags used in the system
able
privs_used ( pu_group_id , pu_st_id)
where
pu_group_id is unique user/group combination used in the system
pu_st_id is a foreign key to security_tags (added in [a])
Example in the system there are two groups of the users:
- admins (allowed to see all),
- limited users,
For those two groups, the privs_used table contains:
1, 10
1, 2
2, 1
2, 3

Regarding (2) changing the granularity of table statistics, embodiments herein can change the granularity of table statistics by adding column referencing combination of the privileges table_statistics ( . . . , ts_pu_group_id) where ts_pu_group_id is a foreign key to privs_used (added in [1.b] of Table H)

Regarding (3) modifying the manner in which statistics are collected, embodiments herein can modify the way of the collecting statistics during the statistic generation process for RST. Additionally, before statistics collection, scan the history of security tags applied during the accessing table, group unique combination, merge it with privs_used table (insert preserving uniqueness of the combinations), and generate statistic for each ts_pu_group_id.

Regarding (4) using the enhanced statistics during plan generation, embodiments herein can determine privilege combinations for the user with use of statistics stored for a user/group.

Embodiments herein recognize that existing databases do not take into account different table sizes for a common table wherein a size differentiation is based on the perspective of the user. As a result, execution plans for current databases can specify IO data access operations on extents that do not include relevant data, and JOIN processes can be performed without optimal efficiency in a manner wherein a larger table from the perspective of a user can precede a smaller table in a join process.

A system of one or more computer can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The computer implemented method also includes identifying an invoked database query for execution on a database, the invoked database query being associated to a user; generating an execution plan for executing the database query on the database; where the generating the execution plan for execution of the database query on the database includes establishing an ordering of first and second tables, the ordering of the first and second tables being in dependence on an access privilege attribute of the user in respect to the first table; and executing the database query according to the execution plan. Other embodiments of this aspect include corresponding computer systems, apparatus, and computer programs recorded on one or more computer storage devices, each configured to perform the actions of the methods.

Implementations may include one or more of the following features. The computer implemented method where the generating the execution plan for execution of the database query on the database is in dependence on statistics data returned from data nodes of the database to a host node in response to the host node sending statistics generation command data to the data nodes. The generating the execution plan for execution of the database query on the database is in dependence on statistics data returned from data nodes of the database to a host node of the database in response to the host node sending statistics generation command data to the data nodes, where the sending statistics generation command data to the data nodes is performed in a response to a determination that the database is idle. The invoked database query associated to a user includes a join clause, where the establishing an ordering of first and second tables included in the database includes establishing an ordering of the first and second tables for joining the first and second table according to the join clause. The invoked database query associated to a user includes a join clause, where the establishing an ordering of first and second tables included in the database includes establishing an ordering of the first and second tables for joining the first and second table according to the join clause, where the generating the execution plan for execution of the database query on the database is in dependence on statistics data returned from data nodes of the database to a host node in response to the host node sending statistics generation command data to the data nodes, and where the method includes determining the access privilege of the user in respect to the first table using the statistics data. The first table is a row secure table (RST), where access privilege data of the user in respect to the table specified a number of rows of the RST which the user has access to, and where the method includes using the number of rows for determining the ordering of the first table and the second table. The generating the execution plan for execution of the database query on the database is in dependence on statistics data returned from data nodes of the database to a host node of the database in response to the host node sending statistics generation command data to the data nodes, where the first table is a row secure table (RST), where access privilege data of the user in respect to the table specifies a number of rows of the RST which the user has access to, and where the method includes using the number of rows for determining the ordering of the first table and the second table. The generating the execution plan for execution of the database query on the database is in dependence on statistics data returned from data nodes of the database to a host node of the database in response to the host node sending statistics generation command data to the data nodes, where the first table is a row secure table (RST), where access privilege data of the user in respect to the table specifies a number of rows of the RST which the user has access to, and where the method includes using the number of rows for determining the ordering of the first table and the second table, where the establishing an execution plan is performed by the host node, and where the establishing is in dependence on the statistics data, where sending, by the host node, the statistics generating command data includes the host node sending security rules command data for applying security rules to the RST, the nodes of the data nodes responsively sending RST statistics to the host node, where the RST statistics includes security data in respect to rows of the RST, where the host node uses the security data to determine the number of rows of the RST which the user has access to. The generating the execution plan for execution of the database query on the database is in dependence on statistics data returned from data nodes of the database to a host node of the database in response to the host node sending statistics generation command data to the data nodes, where the first table is a row secure table (RST), where access privilege data of the user in respect to the first table specifies a number of rows of the RST which the user has access to, and where the method includes using the number of rows for determining the ordering of the first table and the second table, where the establishing an execution plan is performed by the host node, and where the establishing is in dependence on the statistics data, where sending, by the host node, the statistics generating command data includes the host node sending security rules command data for applying security rules to the RST, the nodes of the data nodes responsively sending RST statistics to the host node, where the RST statistics includes security data in respect to rows of the RST, where the host node uses the security data to determine the number of rows of the RST which the user has access to, and where the executing the database query includes the host node sending the security rules command data to nodes of the data nodes for applying the security rules to the RST. The database includes a host node that performs the establishing and a plurality of data nodes in communication with the host node, and where the first and second tables are distributed amongst storage systems of the data nodes, where the method includes sending, by the host node, statistics generating command data to the data nodes and the data nodes responsively sending table statistics data to the host node in response to the statistics generating command data, where the establishing is performed by the host node, and where the establishing is in dependence on the statistics data, where the first table is a row secure table (RST), and where sending, by the host node, the statistics generating command data includes the host node sending security rules command data for applying security rules to the RST, the nodes of the data nodes responsively sending RST statistics to the host node. The database includes a host node that performs the establishing and a plurality of data nodes in communication with the host node, and where the first and second tables are distributed amongst storage systems of the data nodes, where the method includes sending, by the host node, statistics generating command data to the data nodes and the data nodes responsively sending table statistics data to the host node in response to the statistics generating command data, and where the establishing is in dependence on the statistics data. The database includes a host node and data nodes, the first and second tables being distributed on the data nodes. The invoked database query is a user invoked database query that has been invoked by the user. The establishing the execution plan is performed in response to the identifying the invoked database query. The database includes a host node that performs the establishing and a plurality of data nodes in communication with the host node, and where the first and second tables are distributed amongst storage systems of the data nodes, where the method includes sending, by the host node, statistics generating command data to the data nodes and the data nodes responsively sending table statistics data to the host node in response to the statistics generating command data, where the establishing is performed by the host node, and where the establishing is in dependence on the statistics data, where the first table is a row secure table (RST), and where sending, by the host node, the statistics generating command data includes the host node sending security rules command data for applying security rules to the RST, the nodes of the data nodes responsively sending RST statistics to the host node, where the RST statistics includes security data in respect to rows of the RST. The database includes a host node that performs the establishing and a plurality of data nodes in communication with the host node, and where the first and second tables are distributed amongst respective storage systems of the data nodes, where the method includes examining, by the host node, the invoked database query to identify a user associated to the database query and a row secure table (RST), where the RST is provided by the first table, where the method includes locating in a data repository of the host node a statistics system table associated to the first table, and using the statistics system table, determining an access privilege attribute of the user in reference to the first table, adjusting the table size of the first table in dependence on the determining to provide an adjusted table size for the first table and performing the establishing of the ordering of first and second tables using the adjusted table size of the first table.

The database includes a host node that performs the establishing and a plurality of data nodes in communication with the host node, and where the first and second tables are distributed amongst respective storage systems of the data nodes, where the method includes examining, by the host node, the invoked database query to identify a user associated to the database query, a row secure table (RST) and a join clause, where the RST is provided by the first table, where the method includes locating in a data repository of the host node a statistics system table associated to the first table, and using the statistics system table and one or more security association table stored in the data repository, determining an access privilege attribute of the user in reference to the first table, adjusting the table size of the first table in dependence on the determining to provide an adjusted table size for the first table and performing the establishing of the ordering of first and second tables using the adjusted table size of the first table, where the establishing of the ordering of first and second tables using the adjusted table size of the first table is for execution of the join clause. The database includes a host node that performs the establishing and a plurality of data nodes in communication with the host node, and where the first and second tables are distributed amongst respective storage systems of the data nodes, where the method includes examining, by the host node, the invoked database query to identify (i) a user associated to the database query, (ii) a row secure table (RST) referenced by the database query and (iii) a join clause referenced by the database query, where the RST is provided by the first table, where the method includes locating in a data repository of the host node statistical data that has been extracted in response to the host node, prior to a time of invoking of the invoked database query and in idle time of the database, applying security rules to the first table, adjusting the table size of the first table in dependence on the statistical data to provide an adjusted table size for the first table, and performing, by the host node, the establishing of the ordering of first and second tables using the adjusted table size of the first table, where the establishing of the ordering of first and second tables using the adjusted table size of the first table is for execution of the join clause. Implementations of the described techniques may include hardware, a method or process, or computer software on a computer-accessible medium.

One general aspect includes a computer readable storage medium readable by one or more processing circuit and storing instructions for execution by one or more processor for performing a method may include: identifying an invoked database query for execution on a database, the invoked database query being associated to a user; generating an execution plan for executing the database query on the database; where the generating the execution plan for execution of the database query on the database includes establishing an ordering of first and second tables, the ordering of the first and second tables being in dependence on an access privilege attribute of the user in respect to the first table; and executing the database query according to the execution plan. Other embodiments of this aspect include corresponding computer systems, apparatus, and computer programs recorded on one or more computer storage devices, each configured to perform the actions of the methods.

The system also includes a memory; at least one processor in communication with the memory; and program instructions executable by one or more processor via the memory to perform a method may include: identifying an invoked database query for execution on a database, the invoked database query being associated to a user; generating an execution plan for executing the database query on the database; where the generating the execution plan for execution of the database query on the database includes establishing an ordering of first and second tables, the ordering of the first and second tables being in dependence on an access privilege attribute of the user in respect to the first table; and executing the database query according to the execution plan. Other embodiments of this aspect include corresponding computer systems, apparatus, and computer programs recorded on one or more computer storage devices, each configured to perform the actions of the methods.

Figure 5:
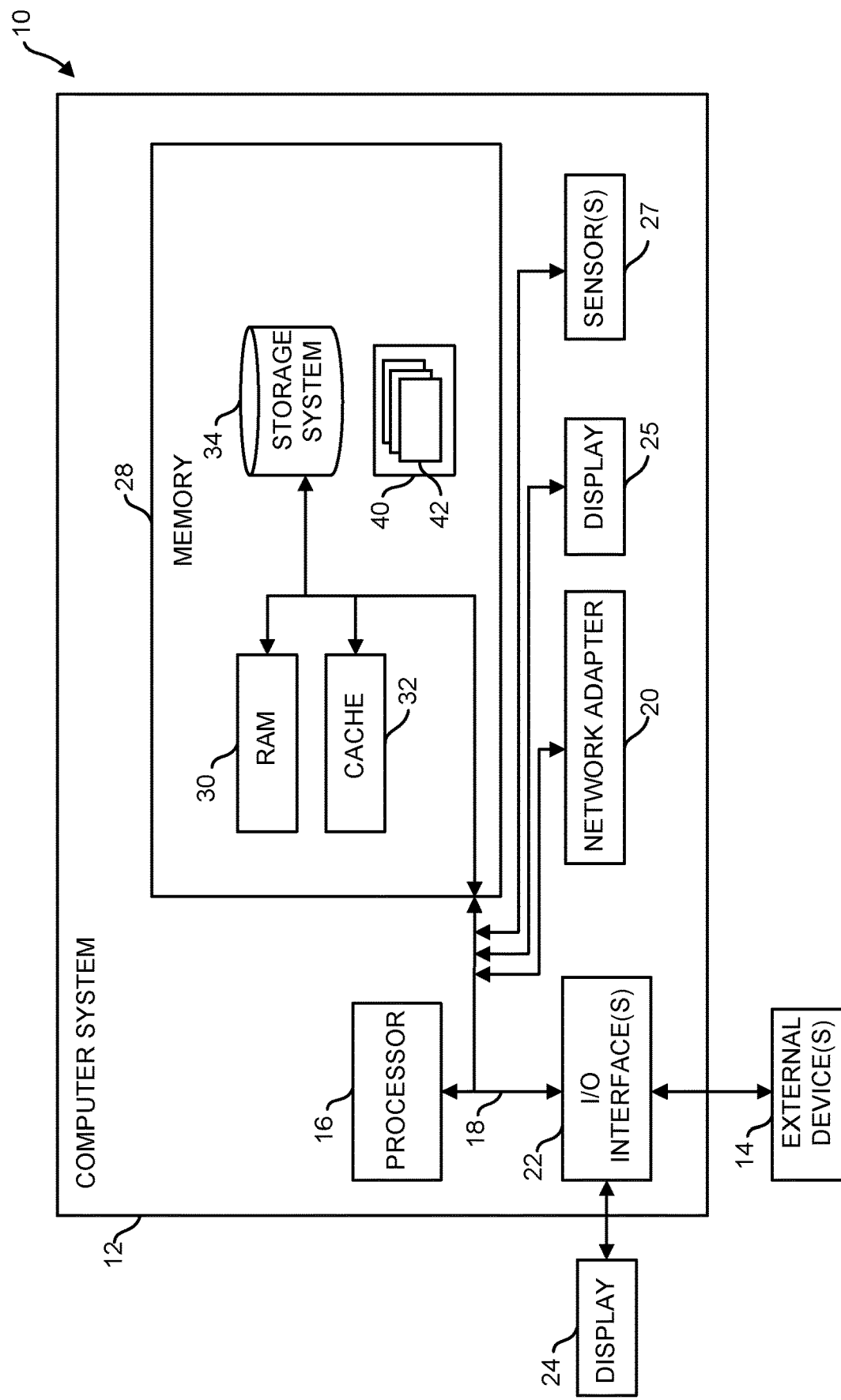
FIG. 5 is a flowchart illustrating a method for performance by a hist node according to one embodiment.
Figure 6:
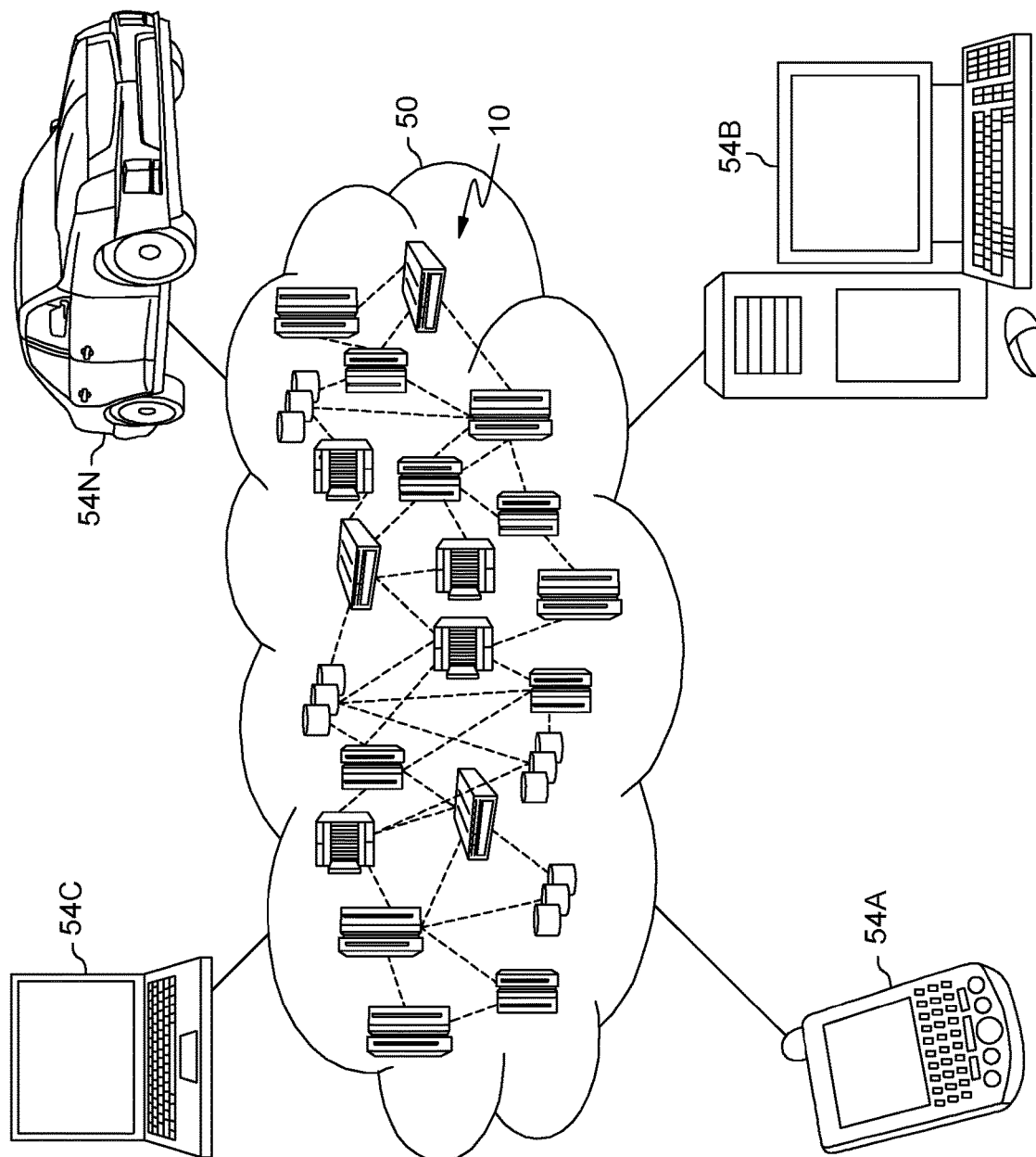
FIG. 6 depicts a cloud computing environment according to one embodiment.
Figure 7:
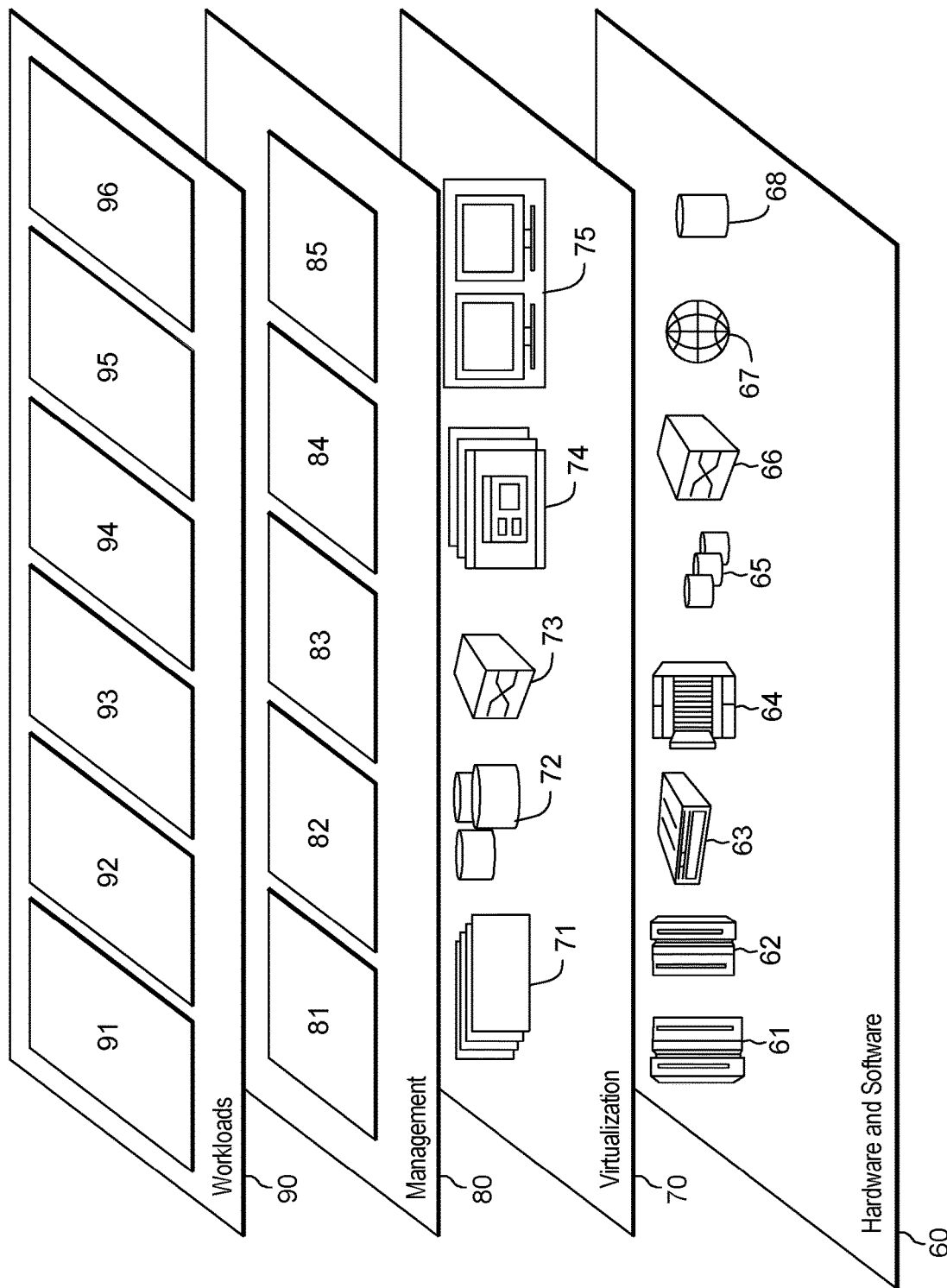
FIG. 7 depicts abstraction model layers according to one embodiment.

Certain embodiments herein may offer various technical computing advantages involving computing advantages to address problems arising in the realm of computer networks. Particularly, embodiments herein can speed performance of database operations. Embodiments herein can speed the performance of database 100 by use of data indicating access privileges of users with respect to an RST. Embodiments herein recognize that speed of a JOIN process of a database query can be increased by establishing an order for a JOIN clause of a database query so that a smaller table referenced in a JOIN clause precedes a larger table referenced in the JOIN clause. Embodiments further herein can use an adjusted table size of an RST for determining a JOIN clause order and can provide the adjusted table size is in dependence on user access privileges in an RST. Embodiments herein recognize that establishing an order for a JOIN clause based on a raw (unadjusted, actual) table row size can slow performance of a database. For identification of an adjusted table row size, embodiments herein as part of a statistics generation process can apply security rules to an RST for return of statistics data indicating access privileges associated to respective rows of the RST. A host node in determining an execution plan can examine statistics systems tables updated using the statistics data. The host node can perform the execution plan by with use of query command data transmissions to the data nodes. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription FIGS. 5-7 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 4-5.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, host node 110 can include one or more computing node 10 and can include one or more program 40 for performing functions described with reference to host node 110 as set forth in the flowchart of FIG. 2. In one embodiment, data nodes 112A-112Z can include one or more computing node 10 and can include one or more program 40 for performing functions described with reference to data nodes 112A-112Z as set forth in the flowchart of FIG. 2. In one embodiment, UE devices 120A-120Z can include one or more computing node 10 and can include one or more program 40 for performing functions described with reference to UE devices 120A-120Z as set forth in the flowchart of FIG. 2. In one embodiment, PI 122 can include one or more computing node 10 and can include one or more program 40 for performing functions described with reference to PI 122 as explained in reference to the flowchart of FIG. 2. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 6 computing node 10 is described as being implemented in a cloud computing environment and accordingly is referred to as a cloud computing node in the context of FIG. 6.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for query execution as set forth herein. The processing components 96 can be implemented with use of one or more program 40 described in FIG. 5.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
identifying an invoked database query for execution on a database, the invoked database query being associated to a user;
generating an execution plan for executing the database query on the database;
wherein the generating the execution plan for execution of the database query on the database includes establishing an ordering of first and second tables, the ordering of the first and second tables being in dependence on an access privilege attribute of the user in respect to the first table, wherein the database includes a host node and data nodes, the first and second tables being distributed on the data nodes; and
executing the database query according to the execution plan.

2. The computer implemented method of claim 1, wherein the generating the execution plan for execution of the database query on the database is in dependence on statistics data returned from data node physical computing nodes defining the data nodes of the database to a host node physical computing node defining the host node of the database in response to the host node physical computing node sending statistics generation command data to the data node physical computing nodes, wherein the host node physical computing node is external to respective ones of the data node physical computing nodes.

3. The computer implemented method of claim 1, wherein the generating the execution plan for execution of the database query on the database is in dependence on statistics data returned from the data nodes of the database to the host node of the database in response to the host node sending statistics generation command data to the data nodes, wherein the sending statistics generation command data to the data nodes is performed in idle time of the database.

4. The computer implemented method of claim 1, wherein the invoked database query associated to a user includes a JOIN clause, wherein the establishing an ordering of first and second tables included in the database includes establishing an ordering of the first and second tables for joining the first and second table according to the JOIN clause.

5. The computer implemented method of claim 1, wherein the invoked database query associated to a user includes a JOIN clause, wherein the establishing an ordering of first and second tables included in the database includes establishing an ordering of the first and second tables for joining the first and second table according to the JOIN clause, wherein the generating the execution plan for execution of the database query on the database is in dependence on statistics data returned from the data nodes of the database to the host node in response to the host node sending statistics generation command data to the data nodes, and wherein the method includes determining the access privilege of the user in respect to the first table using the statistics data.

6. The computer implemented method of claim 1, wherein the first table is a row secure table (RST), wherein access privilege data of the user in respect to the table specified a number of rows of the RST which the user has access to, and wherein the method includes using the number of rows for determining the ordering of the first table and the second table.

7. The computer implemented method of claim 1, wherein the generating the execution plan for execution of the database query on the database is in dependence on statistics data returned from the data nodes of the database to the host node of the database in response to the host node sending statistics generation command data to the data nodes, wherein the first table is a row secure table (RST), wherein access privilege data of the user in respect to the table specifies a number of rows of the RST which the user has access to, and wherein the method includes using the number of rows for determining the ordering of the first table and the second table.

8. The computer implemented method of claim 1, characterized by one or more the following selected from the group consisting of (a), (b), and (c) as follows: (a) wherein the generating the execution plan for execution of the database query on the database is in dependence on statistics data returned from the data nodes of the database to the host node of the database in response to the host node sending statistics generation command data to the data nodes, wherein the first table is a row secure table (RST), wherein access privilege data of the user in respect to the table specifies a number of rows of the RST which the user has access to, and wherein the method includes using the number of rows for determining the ordering of the first table and the second table, wherein the establishing an execution plan is performed by the host node, and wherein the establishing is in dependence on the statistics data, wherein sending, by the host node, the statistics generating command data includes the host node sending security rules command data for applying security rules to the RST, the nodes of the data nodes responsively sending RST statistics to the host node, wherein the RST statistics includes security data in respect to rows of the RST, wherein the host node uses the security data to determine the number of rows of the RST which the user has access to, (b) wherein the generating the execution plan for execution of the database query on the database is in dependence on statistics data returned from the data nodes of the database to the host node of the database in response to the host node sending statistics generation command data to the data nodes, wherein the first table is a row secure table (RST), wherein access privilege data of the user in respect to the first table specifies a number of rows of the RST which the user has access to, and wherein the method includes using the number of rows for determining the ordering of the first table and the second table, wherein the establishing an execution plan is performed by the host node, and wherein the establishing is in dependence on the statistics data, wherein sending, by the host node, the statistics generating command data includes the host node sending security rules command data for applying security rules to the RST, the nodes of the data nodes responsively sending RST statistics to the host node, wherein the RST statistics includes security data in respect to rows of the RST, wherein the host node uses the security data to determine the number of rows of the RST which the user has access to, and wherein the executing the database query includes the host node sending the security rules command data to nodes of the data nodes for applying the security rules to the RST, and (c) wherein the database includes the host node performing the establishing, and wherein the first and second tables are distributed amongst storage systems of the data nodes, wherein the method includes sending, by the host node, statistics generating command data to the data nodes and the data nodes responsively sending table statistics data to the host node in response to the statistics generating command data, and wherein the establishing is in dependence on the statistics data, wherein the first table is a row secure table (RST), and wherein sending, by the host node, the statistics generating command data includes the host node sending security rules command data for applying security rules to the RST, the nodes of the data nodes responsively sending RST statistics to the host node.

9. The computer implemented method of claim 1, wherein the database includes the host node performing the establishing, and wherein the first and second tables are distributed amongst storage systems of the data nodes, wherein the method includes sending, by the host node, statistics generating command data to the data nodes and the data nodes responsively sending table statistics data to the host node in response to the statistics generating command data, and wherein the establishing is in dependence on the statistics data.

10. The computer implemented method of claim 1, wherein the database includes a host node physical computing node defining the host node and data node physical computing nodes defining the data nodes, the first and second tables being distributed on the data node physical computing nodes, wherein the host node physical computing node is external to respective ones of the data nodes node physical computing nodes.

11. The computer implemented method of claim 1, characterized by one or more the following selected from the group consisting of (a), (b), (c) and (d) as follows: (a) wherein the database includes the host node performing the establishing, and wherein the first and second tables are distributed amongst storage systems of the data nodes, wherein the method includes sending, by the host node, statistics generating command data to the data nodes and the data nodes responsively sending table statistics data to the host node in response to the statistics generating command data, and wherein the establishing is in dependence on the statistics data, wherein the first table is a row secure table (RST), and wherein sending, by the host node, the statistics generating command data includes the host node sending security rules command data for applying security rules to the RST, the nodes of the data nodes responsively sending RST statistics to the host node, wherein the RST statistics includes security data in respect to rows of the RST, (b) wherein the database includes the host node performing the establishing and a plurality of data nodes in communication with the host node, and wherein the first and second tables are distributed amongst respective storage systems of the data nodes, wherein the method includes examining, by the host node, the invoked database query to identify a user associated to the database query and a row secure table (RST), wherein the RST is provided by the first table, wherein the method includes locating in a data repository of the host node a statistics system table associated to the first table, and using the statistics system table, determining an access privilege attribute of the user in reference to the first table, adjusting the table size of the first table in dependence on the determining to provide an adjusted table size for the first table and performing the establishing of the ordering of first and second tables using the adjusted table size of the first table, (c) wherein the database includes a host node that performs the establishing and a plurality of data nodes in communication with the host node, and wherein the first and second tables are distributed amongst respective storage systems of the data nodes, wherein the method includes examining, by the host node, the invoked database query to identify a user associated to the database query, a row secure table (RST) and a JOIN clause, wherein the RST is provided by the first table, wherein the method includes locating in a data repository of the host node a statistics system table associated to the first table, and using the statistics system table and one or more security association table stored in the data repository, determining an access privilege attribute of the user in reference to the first table, adjusting the table size of the first table in dependence on the determining to provide an adjusted table size for the first table and performing the establishing of the ordering of first and second tables using the adjusted table size of the first table, wherein the establishing of the ordering of first and second tables using the adjusted table size of the first table is for execution of the JOIN clause, (d) wherein the database includes a host node that performs the establishing and a plurality of data nodes in communication with the host node, and wherein the first and second tables are distributed amongst respective storage systems of the data nodes, wherein the method includes examining, by the host node, the invoked database query to identify (i) a user associated to the database query, (ii) a row secure table (RST) referenced by the database query and (iii) a JOIN clause referenced by the database query, wherein the RST is provided by the first table, wherein the method includes locating in a data repository of the host node statistical data that has been extracted in response to the host node, prior to a time of invoking of the invoked database query and in idle time of the database, applying security rules to the first table, adjusting the table size of the first table in dependence on the statistical data to provide an adjusted table size for the first table, and performing, by the host node, the establishing of the ordering of first and second tables using the adjusted table size of the first table, wherein the establishing of the ordering of first and second tables using the adjusted table size of the first table is for execution of the JOIN clause.

12. The computer implemented method of claim 1, wherein the database includes the host node performing the establishing, and wherein the first and second tables are distributed amongst storage systems of the data nodes.

13. The computer implemented method of claim 1, wherein the database includes a host node physical computing node defining the host node that performs the establishing and a plurality of data node physical computing nodes defining the data nodes in communication with the host node, wherein the data node physical computing nodes are external to one another, wherein the host node physical computing node is external to respective ones of the data node physical computing nodes, and wherein the first and second tables are distributed amongst storage systems of the data node physical computing nodes.

14. The computer implemented method of claim 1, wherein the generating the execution plan for execution of the database query on the database is in dependence on statistics data returned from the data nodes of the database to a host node in response to the host node sending statistics generation command data to the data nodes.

15. The computer implemented method of claim 1, wherein the database includes a host node physical computing node defining the host node that performs the establishing and a plurality of data node physical computing nodes defining the data nodes in communication with the host node, wherein the data node physical computing nodes are external to one another, wherein the host node physical computing node is external to respective ones of the data node physical computing nodes, and wherein the first and second tables are distributed amongst storage systems of the data node physical computing nodes so that a first segment of the first table is stored on a storage system of a first data node physical computing node of the data node physical computing nodes, and further so that a second segment of the first table is stored on a storage system of a second data node physical computing node of the data node physical computing nodes.

16. The computer implemented method of claim 1, wherein the database includes a host node physical computing node defining the host node that performs the establishing and a plurality of data node physical computing nodes defining the data nodes in communication with the host node, wherein the data node physical computing nodes are external to one another, wherein the host node physical computing node is external to respective ones of the data node physical computing nodes, and wherein the first and second tables are distributed amongst storage systems of the data node physical computing nodes so that a first segment of the first table is stored on a storage system of a first data node physical computing node of the data node physical computing nodes, a second segment of the first table is stored on a storage system of a second data node physical computing node of the data node physical computing nodes, a first segment of the second table is stored on a storage system of the first data node physical computing node of the data node physical computing nodes, and further so that a second segment of the second table is stored on a storage system of the second data node physical computing node of the data node physical computing nodes.

17. The computer implemented method of claim 1, wherein the generating the execution plan for execution of the database query on the database is in dependence on statistics data returned from the data nodes of the database to the host node of the database in response to the host node sending statistics generation command data to the data nodes, wherein the sending statistics generation command data to the data nodes is performed in a response to a determination that the database is idle.

18. A computer program product comprising:
a computer readable storage medium readable by one or more processing circuit and storing instructions for execution by one or more processor for performing a method comprising:
identifying an invoked database query for execution on a database, the invoked database query being associated to a user;
generating an execution plan for executing the database query on the database;
wherein the generating the execution plan for execution of the database query on the database includes establishing an ordering of first and second tables, the ordering of the first and second tables being in dependence on an access privilege attribute of the user in respect to the first table, wherein the database includes a host node and data nodes, the first and second tables being distributed on the data nodes; and
executing the database query according to the execution plan.

19. A system comprising:
a memory;
at least one processor in communication with the memory; and
program instructions executable by one or more processor via the memory to perform a method comprising:
identifying an invoked database query for execution on a database, the invoked database query being associated to a user;
generating an execution plan for executing the database query on the database;
wherein the generating the execution plan for execution of the database query on the database includes establishing an ordering of first and second tables, the ordering of the first and second tables being in dependence on an access privilege attribute of the user in respect to the first table, wherein the database includes a host node and data nodes, the first and second tables being distributed on the data nodes; and
executing the database query according to the execution plan.

20. The system of claim 19, wherein the generating the execution plan for execution of the database query on the database is in dependence on statistics data returned from the data nodes of the database to the host node of the database in response to the host node sending statistics generation command data to the data nodes, wherein the sending statistics generation command data to the data nodes is performed in idle time of the database.

* * * * *